L. J. LINDSAY.
STEERING CONTROL DEVICE.
APPLICATION FILED SEPT. 21, 1921.
1,435,403.
Patented Nov. 14, 1922.
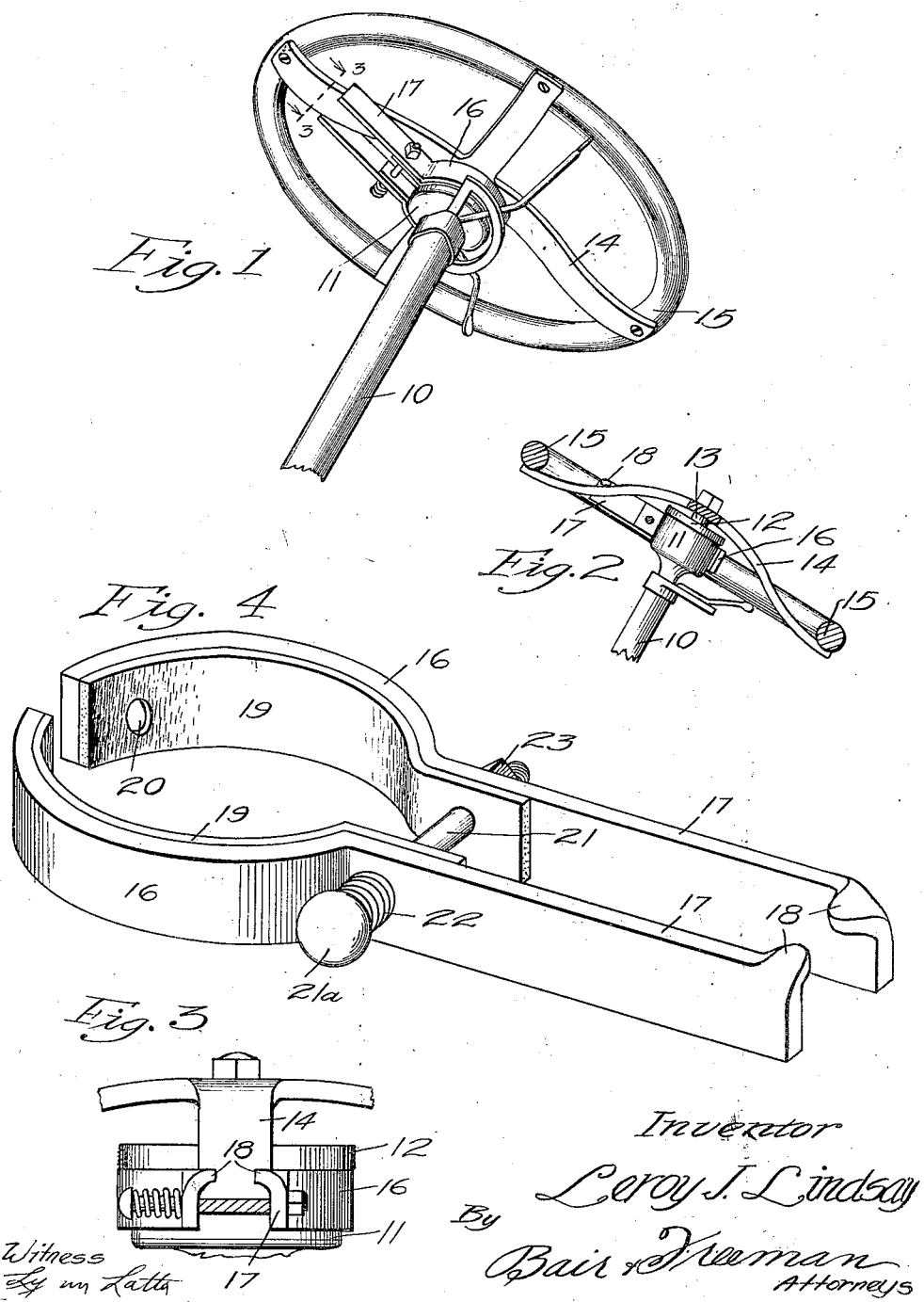

Patented Nov. 14, 1922.

1,435,403

UNITED STATES PATENT OFFICE.

LEROY J. LINDSAY, OF SEYMOUR, IOWA.

STEERING-CONTROL DEVICE.

Application filed September 21, 1921. Serial No. 502,100.

*To all whom it may concern:*

Be it known that I, LEROY J. LINDSAY, a citizen of the United States, and a resident of Seymour, in the county of Wayne and State of Iowa, have invented a certain new and useful Steering-Control Device, of which the following is a specification.

My invention relates to steering control attachments for steadying the steering wheel and freeing the driver from the discomfort caused by vibration of the steering wheel and back-lash on the steering gears.

The object of my invention is to provide such a steering control device adapted to be mounted on the fixed steering post for frictionally gripping the same and to engage the steering wheel, so as to hold the steering wheel against rotation due to vibration or back-lash, and yet to permit a free operation of the wheel for steering a motor vehicle.

Another purpose of my invention is to provide such a device, which is of very simple and inexpensive construction, and therefore can be made at a small cost and sold at a low price.

A further object of my invention is to provide such a steering control device, comprising parts which can be readily and easily mounted on or detached from the steering post and wheel.

An additional object is to provide such a device, having members which can be readily and easily assembled and can then be left in assembled condition and can be mounted on or detached from the motor vehicle without disassembling the parts of the steering control device, so that there is no likelihood of the parts being lost or misplaced.

A further object is to provide such a steering device, comprising opposite members, each having a portion adapted to grip a fixed steering post, and to provide for each of such portions a lining member, preferably projecting beyond said portion and so arranged as to be reversed for securing a maximum length of wearing time for such lining members, which lining members and steering attachment members are secured together by a single bolt or the like extended through the steering attachment members and the lining members.

Still a further object is to mount the steering attachment on the motor vehicle in such manner that the attachment is engaged on the fixed steering post with yielding pressure, so as to give a firm frictional grip, which will, however, permit the ready operation of the steering wheel.

Another object is to provide such a steering attachment made of two simple parts, preferably formed from bars or strips of metal, each part having a portion adapted to engage a fixed steering post and a projecting part lying in substantially the same plane as the fixed part, adapted to engage one side of a spoke of the steering wheel and having a projecting lip or the like for overlying the top of the spoke, so as to prevent the device from slipping downwardly on the steering post.

A further object is to provide such a device so constructed and arranged, so that it will occupy a relatively small space on the steering post and will not detract from the appearance of the car.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a perspective view of a steering post and steering wheel equipped with a steering control device embodying my invention.

Figure 2 shows a vertical, sectional view through the steering wheel and attachment, illustrating the manner of mounting the attachment on the vehicle.

Figure 3 shows a detail, sectional view taken on the line 3—3 of Figure 1; and

Figure 4 shows a perspective view of the steering control attachment.

My invention is readily applicable to a considerable variety of motor vehicles, but is especially designed for use with the Ford automobile.

It is well-known that with the Ford, as with some other cars, there is considerable vibration and rotation of the steering wheel, due to back-lash in the steering gears and other causes, which causes considerable discomfort and inconvenience to the driver.

The desirability of having the wheel freed from such vibration and rotation is obvious.

My device connects the steering wheel with the fixed steering post in such a way that the wheel is held by frictional engagement with the steering post, so as to be free from a large part of such rotation and vibration.

In the accompanying drawings, whereby my invention is illustrated, I have used the reference numeral 10 to indicate generally a fixed hollow steering post, having at the upper end, the gear casing 11, at the upper portion of which is a shoulder 12.

In the particular automobile under consideration, a short shaft 13 projects into the gear casing 11 and is connected by suitable gears with the ordinary steering shaft. Secured to the short shaft 13 are the spokes 14 of the steering wheel, which are inclined radially away from the shaft 13 and also downwardly, as illustrated particularly in Figures 1 and 2.

The outer ends of the spokes 14 are secured to the rim 15 of the steering wheel.

My improved steering control attachment comprises two opposite coacting members, which may be made in each instance of a single strip or bar of iron. Each steering attachment member has a curved portion 16 at one end, adapted to fit the casing 11 which forms part of the steering post 10.

Lying substantially in the same plane as the portion 16 and extending away therefrom is a straight portion 17 which has at the upper part of its upper end, an overhanging lip or the like 18.

It will be understood that the members of my steering control attachment are made in rights and lefts and that the lips 18 project toward each other.

On the inside of each portion 16 is a wear strip 19 preferably made of leather, but which may be made of any suitable material adapted for the purpose. The wear strip 19 is long enough to extend along the inside of the portion 17 of the steering control attachment member for a certain distance beyond the portion 16, as illustrated in Figure 4.

The wear strips 19 are provided with holes 20 located preferably equi-distances from their ends. The portions 17 are provided with registering holes, and the holes 20 are so arranged that when the wear strips are in place, one hole 20 of each wear strip will register with the hole in the adjacent member 17.

Extended through the holes in the portions 17 and the registering holes in the wear strips is a bolt 21, having on one end a head 21ª and on the other end a nut 23. On the bolt 21 between the head thereof and the nearest portion 17 is a coil spring 22.

The device is assembled as shown in Figure 4, and it will be seen that both steering control attachment members and both wear strips are mounted on a single bolt 21.

The parts are so arranged that when the device is installed on the motor vehicle, the steering control attachment members stand substantially spaced from each other. The holes in the members 17 are large enough to allow some play of the bolt 21 in order that after the attachment is once assembled, it need not be taken apart for installation on the car.

In installing the device, the nut 23 is screwed to a point near the outer end of the bolt 21, thus allowing the steering attachment members to spread apart as much as possible. The portions 16 are then forced apart, the spring 22 being thereby placed under tensions and the free ends of the members 17 being swung toward each other.

The members 16 may be forced apart far enough to permit their being slipped over the gear casing 11. One of the members 17 is then placed alongside one of the spokes 14 with the lip 18 over-lying the spoke and the other member 17 is then forced away from the installed member 17 again compressing the spring 22 and is swung upwardly until its lip 18 clears the spring 22, whereupon the said member 17 may be slipped into its proper position and the nut 23 may be tightened so as to cause the member 16 to grip the gear casing 11 and the member 17 to grip the sides of the spoke.

By reversing the operations, the attachment may be removed without disassembling it.

It will be seen that when the attachment is assembled on the steering post and wheel, the steering wheel will be held against rotation by the frictional engagement of the parts of the attachment with the steering post.

The tension of the spring 22 may be varied by adjusting the nut 23, so that the tightness with which the attachment grips the steering post may be regulated to suit the requirements of the situation.

When my device is used, the steering wheel will be free from the ordinary rotary vibration and movement, due to back-lash of the steering gears, and I find that the attachments thus add very greatly to the comfort of the driver and greatly reduces his fatigue, especially on long drives.

I find that the use of the leather strip 19 is very desirable, since it permits an easy adjustment of the attachment to the steering post. The wear strips afford a better grip by the attachment and the steering post.

By making the wear strips as herein described, they are easy and inexpensively assembled, as part of the attachment and are always held in proper position, and can not be accidentally lost or misplaced.

As the wear strips wear, the attachment may be taken up and tightened by screwing the nut 23 farther onto the bolt 21. If the wear strips should become considerably worn, they may be reversed end to end, and provision is made for such reversal by providing the wear strips 19 with the holes 20 near each end thereof.

The screw-threaded portion of the bolt 21 is so arranged that the nut 23 can only be moved a certain amount, thus limiting the tension that can be applied to the spring 22. In this way, the danger of the operator from applying too great a tension on the device is avoided.

It is my intention to cover by my claims of the patent to be issued upon my application, any modified forms of structure of my device or any use of mechanical equivalents, which may be reasonably included within their scope.

I claim as my invention:

1. In combination with a movable steering post having a steering wheel thereon and a hollow fixed post, a pair of similar members arranged to frictionally grip a portion of the fixed post and to extend laterally therefrom, said pair of members being spaced from each other and adapted to receive a portion of the steering wheel therebetween for preventing undesired movement of the steering wheel relative to the fixed hollow post and means for yieldingly causing said pair of members to grip the fixed post and steering wheel, for the purposes stated.

2. In combination with a movable steering post having a steering wheel thereon, and a hollow fixed portion for receiving said movable steering post, a pair of similar members having a portion at one end thereof adapted to frictionally grip a portion of said fixed post, the opposite ends of said pair of members being spaced from each other for receiving a portion of the steering wheel therebetween, and yielding means arranged for connecting said pair of members for causing them to frictionally engage said fixed post and to engage said steering wheel for preventing undesired movement of the steering wheel relative to the fixed post, all for the purposes stated.

3. In combination with a movable steering post having a steering wheel thereon, and a hollow fixed post for receiving said movable steering post, a pair of similar members having a portion at one end thereof adapted to frictionally grip a portion of said fixed post, the opposite ends of said pair of members being spaced from each other for receiving a portion of the steering wheel therebetween, and yielding means arranged intermediate of the ends of said pair of members for connecting said pair of members for causing them to frictionally engage said fixed post and to engage said steering wheel for preventing undesired movement of the steering wheel relative to the fixed post, all for the purposes stated.

4. The combination of a fixed steering post, a steering shaft therein and a steering wheel on said shaft having spokes inclined from their inner ends downwardly and outwardly with a steering control attachment comprising a pair of coacting members lying in the same plane, each member having a portion for engaging said post and a projecting portion substantially in said plane adapted to engage the downwardly inclined portion of a spoke, and means for yieldingly drawing said members toward each other for causing them to grip said post and spoke.

5. A steering control attachment comprising a pair of members, each having a portion for engaging a steering post and a portion for engaging a steering wheel spoke, wear strips on the inner sides of said first portions projecting therefrom, a bolt extended through both wear strips and both members for holding the attachment in place.

6. A steering control attachment, comprising a pair of members, each having a portion for engaging a steering post and a portion for engaging a steering wheel spoke, a bolt or the like extended through both of said latter portions, wear strips on the inner sides of said first portions, having parts overlapping said second described portions of the attachment members, each of said wear strips being provided with holes near its opposite ends, so that the wear strips may be reversed and in either of their positions may be mounted on said bolt.

7. A steering control attachment, comprising a pair of rigid members, each comprising a strip having at one end a curved portion adapted to fit a steering wheel post and at its other end, a projecting portion lying in the same plane as said curved portion and adapted to engage the side of a steering wheel spoke, and provided with a lip for overhanging said spoke, a bolt extended through said last described portions, a nut on one end of said bolt, said bolt having a head at its other end, a spring on said bolt between the head and the adjacent control attachment member, whereby said attachment members may be drawn toward each other in spaced relation under yielding pressure for engaging a fixed steering post and a steering wheel spoke.

LEROY J. LINDSAY.